(12) United States Patent
Gangadharan et al.

(10) Patent No.: US 11,785,669 B2
(45) Date of Patent: Oct. 10, 2023

(54) SYSTEMS AND METHODS FOR ETHERNET LINK SHARING TO CONCURRENTLY SUPPORT MULTIPLE RADIOS

(71) Applicant: EdgeQ, Inc., Santa Clara, CA (US)

(72) Inventors: Hariprasad Gangadharan, Karnataka (IN); Gopalakrishnan Perur Krishnan, Karnataka (IN); Vishwanatha Tarikere Basavaraja, Karnataka (IN)

(73) Assignee: EdgeQ, Inc., Santa Clara, CA (US)

( * ) Notice: Subject to any disclaimer, the term of this patent is extended or adjusted under 35 U.S.C. 154(b) by 182 days.

(21) Appl. No.: 17/390,338

(22) Filed: Jul. 30, 2021

(65) Prior Publication Data

US 2023/0035096 A1 Feb. 2, 2023

(51) Int. Cl.
*H04W 88/06* (2009.01)

(52) U.S. Cl.
CPC .................... *H04W 88/06* (2013.01)

(58) Field of Classification Search
CPC .................................................. H04W 88/06
See application file for complete search history.

(56) References Cited

U.S. PATENT DOCUMENTS

| | | | | |
|---|---|---|---|---|
| 5,720,032 A * | 2/1998 | Picazo, Jr. et al. | ...... | H04L 49/90 709/213 |
| 9,391,841 B2 * | 7/2016 | Pope | ............. | H04L 41/083 |
| 9,880,776 B1 * | 1/2018 | Tsaur et al. | ............. | G06F 3/067 |
| 2004/0179534 A1 * | 9/2004 | Pettey et al. | ......... | H04L 49/351 370/395.5 |
| 2008/0259555 A1 * | 10/2008 | Bechtolsheim et al. | ................... | G06F 13/409 361/725 |
| 2019/0065427 A1 | 2/2019 | Wortman | | |
| 2020/0412669 A1 | 12/2020 | Schubert et al. | | |
| 2021/0029549 A1 | 1/2021 | Notargiacomo et al. | | |
| 2021/0058334 A1 | 2/2021 | Greth et al. | | |
| 2022/0200669 A1 * | 6/2022 | Banuli Nanje Gowda | ................. | G06F 9/466 |
| 2023/0035096 A1 * | 2/2023 | Gangadharan et al. | | H04W 88/06 |

OTHER PUBLICATIONS

International Search Report and Written Opinion of the International Searching Authority mailed Oct. 25, 2022 in related PCT application No. PCT/US22/37408, (8 pgs).

* cited by examiner

*Primary Examiner* — Julio R Perez
(74) *Attorney, Agent, or Firm* — North Weber & Baugh LLP; Michael North

(57) ABSTRACT

With advanced compute capabilities and growing convergence of wireless standards, it is desirable to run multiple wireless standards, e.g., 4G, 5G NR, and Wi-Fi, on a single signal processing system. In the present disclosure, two baseband processors are used with each processor dedicated for one type of signal processing, such as 5G or Wi-Fi. The two baseband processors are interlinked via a chip-to-chip interconnect link for ingress and egress data transfer between the two processors. These two processors share an Ethernet link for benefits including cost saving, reduction in overall chipset power, and reduced form factor of the enclosure. Application of the disclosed embodiments may realize concurrent 5G Fronthaul and Wi-Fi traffic processing on the same Ethernet link. Such an application may be applied to other related scenarios, including Ethernet link sharing for dual Wi-Fi baseband processors, and Ethernet link sharing for Wi-Fi and gNodeB deployments, etc.

20 Claims, 9 Drawing Sheets

SYSTEMS AND METHODS FOR ETHERNET LINK SHARING TO CONCURRENTLY SUPPORT MULTIPLE RADIOS

TECHNICAL FIELD

The present disclosure relates generally to systems and methods for Ethernet link sharing. More particularly, the present disclosure relates to systems and methods for high speed Ethernet link sharing to concurrently support multiple radios with one or more baseband processors.

BACKGROUND

The importance of wireless communication in today's society is well understood by one of skill in the art. Advances in wireless technologies have resulted in the ability of a communication system to support wireless communications of different standards, e.g., 5G New Radio (NR), 4G LTE, Wi-Fi, etc. Different wireless standards have aspects which are very different from each other - fundamental frame structures, timing of symbols, forward error correction (FEC) codes, data rates, tolerance to delays.

5G Fronthaul relies on enhanced Common Packet Radio Interface (eCPRI) transport protocol supported over Ethernet links. Wi-Fi access points are also typically connected to the network via Ethernet links.

There are potential wireless deployment scenarios involving multiple baseband processors that process 5G-NR (or LTE), and Wi-Fi traffic, which are placed within the same enclosure. A method that helps share the same high speed Ethernet link for various baseband processing applications would be advantageous, considering the significant cost savings on the Ethernet optical module/ cage, and Ethernet physical layer (PHY). An additional benefit is the reduction in overall chipset power and form factor of the enclosure. However, it is complex to meet the required performance, latency, throughput expectations across these wireless technologies on the same Ethernet link.

Accordingly, what is needed are systems, devices and methods that address the above-described issues for Ethernet link sharing.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
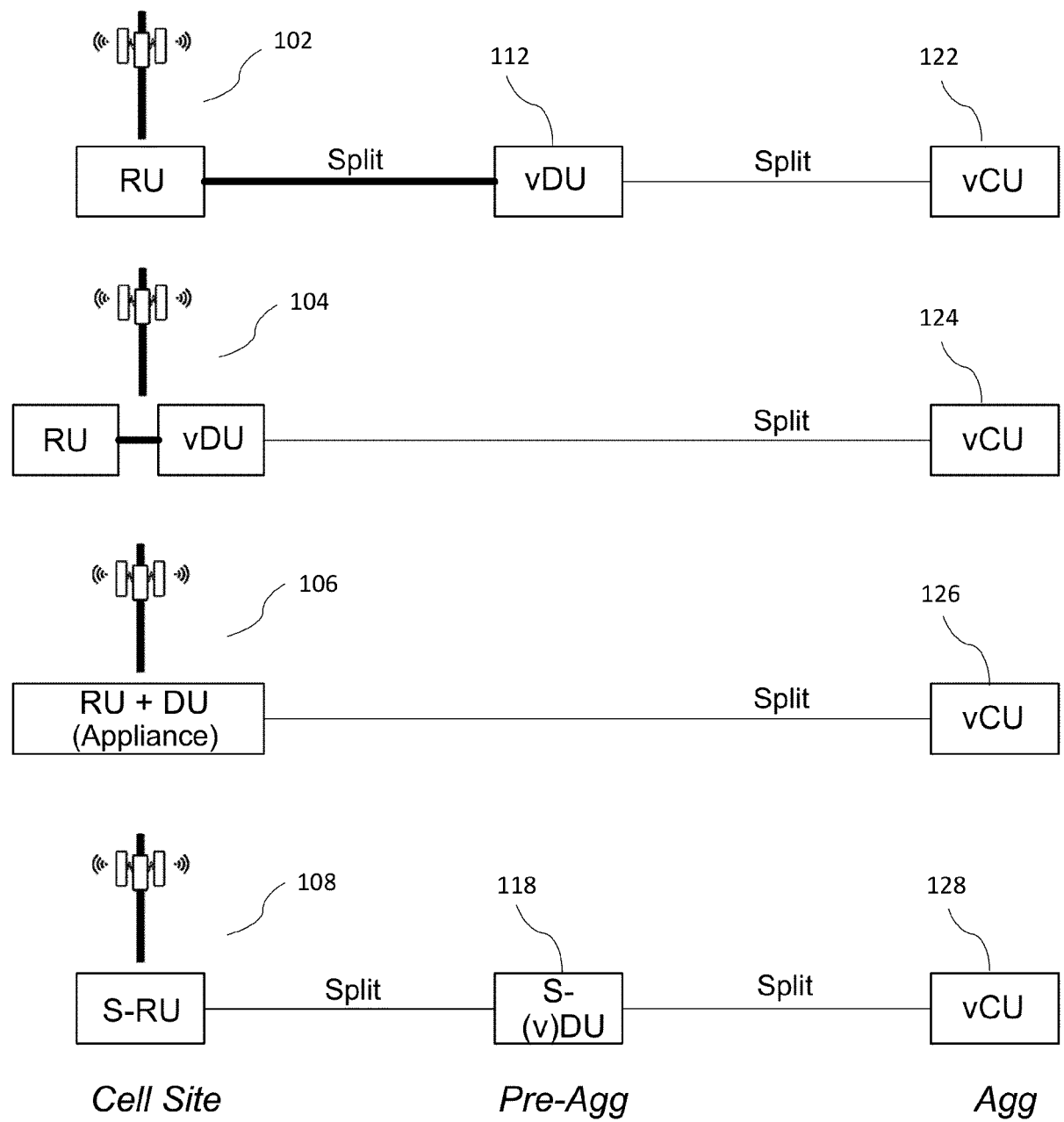
FIG. 1 ("FIG. 1") depicts various open radio access network (RAN) deployments for a telecommunication service provider, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" or "packet" shall not be interpreted as limiting embodiments of the present invention to 5G networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

A. Open RAN Deployment Models

A radio access network (RAN) is part of a telecommunication system. It implements a RAT to provide connection between a device, e.g., a mobile phone, and a core network (CN). Open RAN is an approach based on interoperability and standardization of RAN elements including a unified interconnection standard for white-box hardware and open source software elements from different vendors.

FIG. 1 depicts various open radio access network (RAN) deployments for a telecommunication service provider, according to embodiments of the present disclosure. As shown in FIG. 1, a radio unit (RU) 102 may couple to a virtual distribution unit (vDU) 112 with a split, e.g., ORAN 7-2 split, which is a Low PHY/High PHY split for ultra-reliable low-latency communication (URLLC) and near-edge deployment. The vDU 112 then couples to a virtual central unit (vCU) 122 with a split, e.g., split 2, which is referred as radio resource control and packet data convergence control split from the Layer 2 radio link control (RLC). Alternatively, a vDU may be deployed on the side of an RU 104, and then couples to a vCU 124 with a split, e.g., split 2. Alternatively, a distribution unit (DU) and an RU may be integrated as an appliance 106, which then couples to a vCU 126 with a split, e.g., split 2. Alternatively, a RU may be a small cell RN (S-RU) 108 couples to a small cell DU or vDU (S-vDU) 118 using a split, e.g., a MAC/PHY layer split (split 6). The S-vDU 118 then couple to a vCU 128 with a split, e.g., split 2.

A service provider (SP) may adopt more than one Open RAN deployment models based on band, Fronthaul bandwidth requirements, or deployment type (macro/small cell), etc. Deployment models are influenced or decided based on multiple factors, including Fibre availability, real-estate/site/location constraints at pre-aggregation (Pre-Agg) and cell sites, total cost of ownership (TCO), Operational preference, etc. It is desirable for SPs to achieve maximum consistency around architecture, systems and operational model across all these deployment models.

With constant development of Wi-Fi technology, Wi-Fi access points (APs), especially 5G Wi-Fi APs, may transmit or receive signals at a frequency (e.g., 2.4 GHz, 5 GHz, or 6 GHz) within the frequency range 1 (FR1) for 5G communication. An RU serving 5G communications may also be configured for transmitting or receiving 5G Wi-Fi signals. Accordingly, a 5G station or a 5G femtocell may be deployed to serve both 5G and Wi-Fi communications. However, using specialized or separate hardware to separately process the 5G and Wi-Fi standards would result in complex hardware, increase power consumption for operation, and drive up the cost of the of the whole system. It would be desirable to have a unified or at least partially unified hardware that may be configured for simultaneous transmission and reception of different radio access technologies, including Wi-Fi. The unification may be at various levels, e.g., enclosure level, baseband processor level, or data flow path (or part of data flow path) level, etc. For example, Ethernet link sharing may be implemented among different types of data flows that may be processed by corresponding baseband processors separately, or handled by a single baseband processor configured for supporting multiple wireless technologies.

Described in the following sections are embodiments for Ethernet link sharing to realize concurrent traffic processing for various use cases, e.g., 5G Fronthaul and Wi-Fi deployment, 5G gNodeB and Wi-Fi deployment, or dual Wi-Fi baseband processors, etc. Embodiments of the present patent document may also be applied with various Ethernet links, e.g., 10 Gbps, 25 Gbps, or 50 Gbps, etc.

B. Embodiments for Ethernet Link Sharing Between 5G Fronthaul and Wi-Fi Deployments 5G Fronthaul traffic over eCPRI transport has tight latency requirements. Carrying 5G Fronthaul over the same Ethernet link as Wi-Fi traffic may be very challenging. Embodiments of Ethernet link sharing between 5G Fronthaul and Wi-Fi disclosed in this section may be very beneficial before data flows corresponding to the 5G Fronthaul traffic and the Wi-Fi traffic are processed in one or more baseband processors, since system BOM (bill of materials) cost may be saved significantly.

Figure 2:
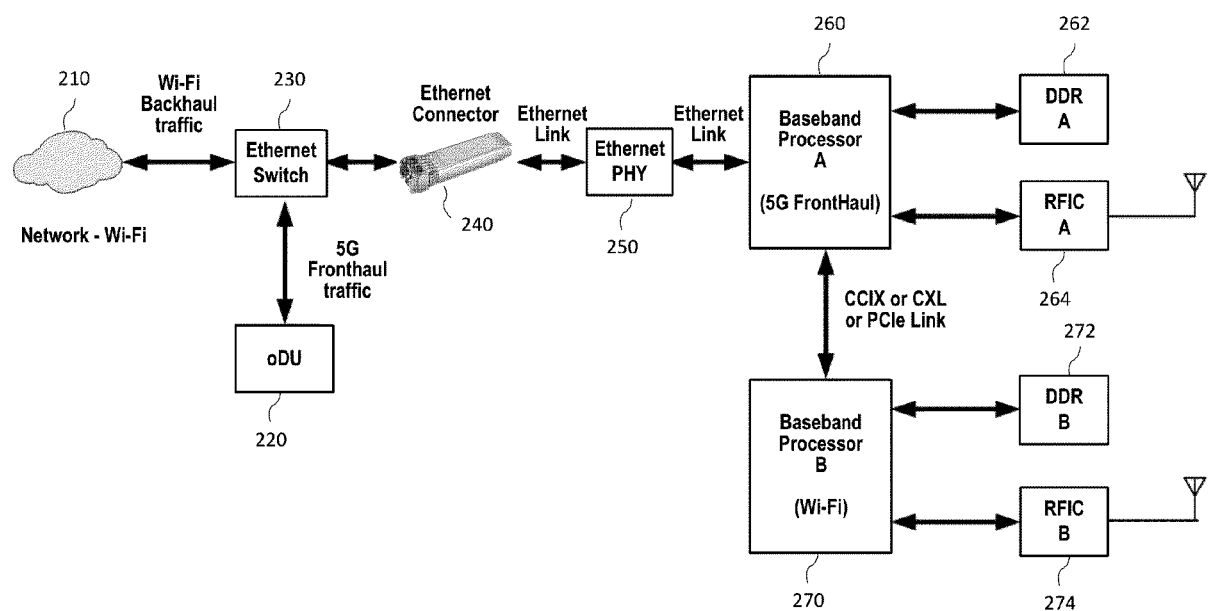
FIG. 2 graphically depicts Ethernet link sharing between 5G Fronthaul and Wi-Fi deployments, according to embodiments of the present disclosure.

FIG. 2 graphically depicts Ethernet link sharing between 5G Fronthaul and Wi-Fi deployments, according to embodiments of the present disclosure. As shown in FIG. 2, two baseband processors, one 260 dedicated for 5G processing and one 270 dedicated for Wi-Fi respectively, are used for Ethernet link sharing between 5G Fronthaul and Wi-Fi deployments. The first baseband processor 260 and the second baseband processor 270 may be interlinked, e.g., via a cache coherent interconnect for accelerators (CCIX) link. CCIX link could as well be replaced by a compute express link (CXL), or by any other chip-to-chip interconnect link such as PCIe (peripheral component interconnect express, or PCI express). Although CCIX and CXL are chip-to-chip interfacing standards primarily for data accelerator applications, CCIX or CXL may be employed for data movement across two baseband processors in embodiments of the present patent.

The first baseband processor 260 couples to a Wi-Fi network 210 and a 5G unit 220 (e.g., outdoor unit (oDU)) through a shared Ethernet link, which comprises an Ethernet switch 230, an Ethernet connector 240, and an Ethernet physical layer (PHY) 250. The Ethernet switch 230 communicates to the Wi-Fi network 210 and the 5G unit 220 for Wi-Fi Backhaul traffic and 5G Fronthaul traffic communication respectively.

The first baseband processor 260 couples to a first local memory 262 for data read/write operation and a first radio frequency integrated circuit (RFIC) 264 for signal communication wirelessly. Similarly, the second baseband processor 270 couples to a second local memory 272 for data read/write operation and a second radio frequency integrated circuit (RFIC) 274 for signal communication wirelessly.

In an alternate embodiment, the different radio access technologies (RATs) may be supported on the same baseband processor using different processing blocks (e.g., different cores). Ethernet link sharing may still be implemented for reducing costs. Furthermore, although FIG. 2 describes 5G Fronthaul and Wi-Fi deployments, the Fronthaul traffic may not be limited to 5G Fronthaul. The structure shown in FIG. 2 and data flows shown in FIGS. 3A-3B may also be applicable to 4G/LTE deployments.

Figure 3A:
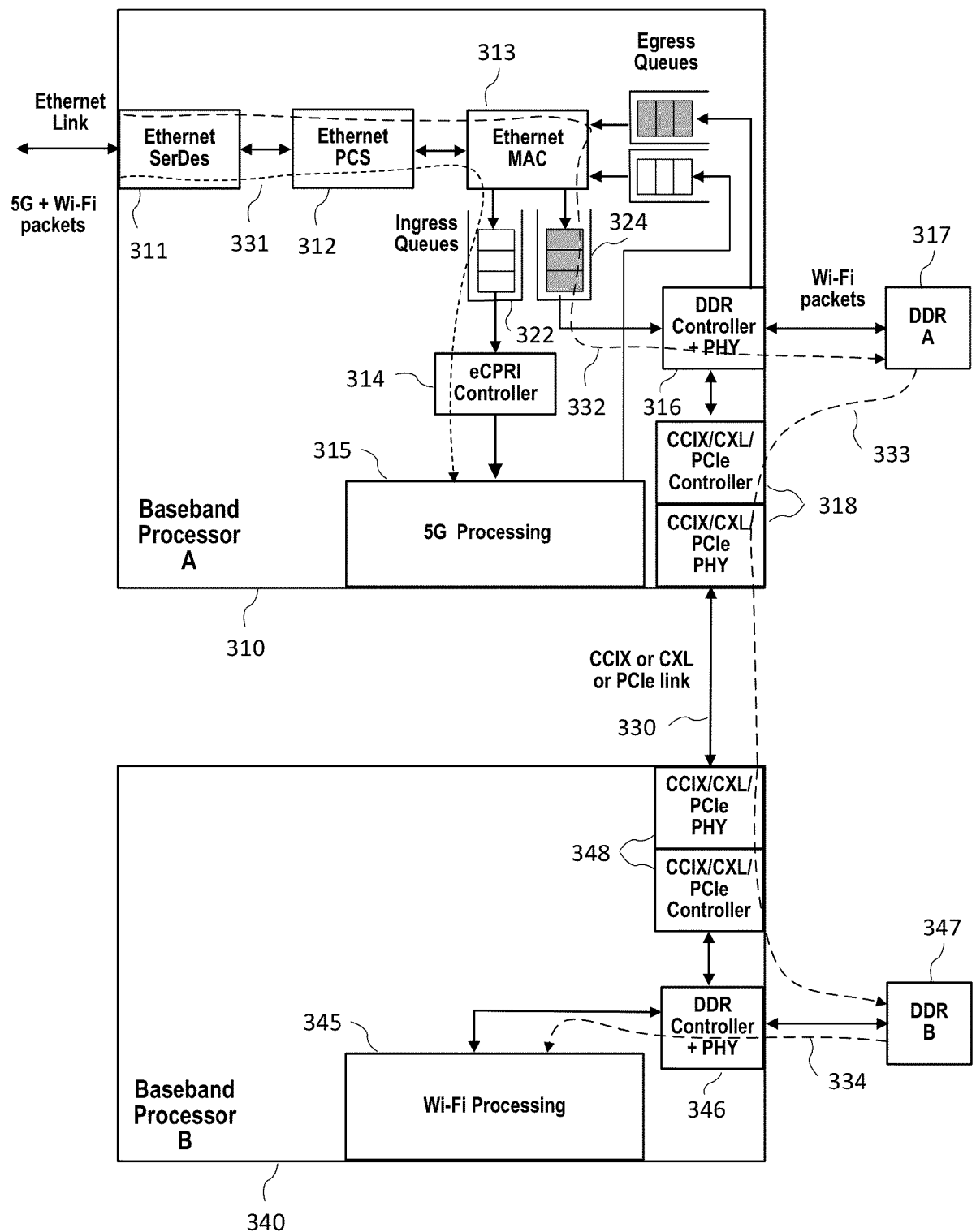
FIG. 3A graphically depicts ingress data flows for Ethernet link sharing between 5G Fronthaul and Wi-Fi deployments, according to embodiments of the present disclosure.

FIG. 3A graphically depicts ingress data flows for Ethernet link sharing between 5G Fronthaul and Wi-Fi deployments, according to embodiments of the present disclosure. Ingress Ethernet packets, comprising both 5G packets and Wi-Fi packets, enter the first baseband processor 310 via a high speed SerDes (Serializer/Deserializer) 311, which may operate at 10 Gbps, 25 Gbps, or 50 Gbps, etc. These Ingress Ethernet packets are stripped of physical layer information at an Ethernet Physical Coding Sublayer (PCS) 312, and then enter a Medium Access control (MAC) block 313.

The MAC block 313 queues 5G packets in the ingress data into an ingress queue 322 designated for 5G ingress data. The queued 5G packets are streamed to an eCPRI Controller 314, and subsequently to a 5G processing block 315 in the first baseband processor 310. The 5G processing block 315 may comprise one or more cores (and allocated caches) specified for 5G signal processing. The ingress flow for 5G traffic is shown as the dashed line 331.

In one or more embodiments, the ingress flow for Wi-Fi traffic may take multiple steps. The MAC block 313 queues Wi-Fi packets in the ingress data into an ingress queue 324 designated for Wi-Fi ingress data. The ingress queue 324 for Wi-Fi ingress data may be independent from the ingress queue 322 for 5G ingress data. The queued Wi-Fi packets are stored into a local memory (e.g., a double data rate (DDR) memory) 317 of the first baseband processor 310 using direct memory access (DMA) by a first DMA controller (e.g., a DDR controller) 316. This step of ingress flow for Wi-Fi traffic is shown as the dashed line 332.

Subsequently, a first DMA engine 318 fetches Wi-Fi packets from the local memory 317. The first DMA engine 318 may a PCIe (or CCIX, or CXL) DMA engine comprising a PCIe controller (or a CCIX controller, or CXL controller) and a PCIe PHY (or CCIX PHY, or CXL PHY). The fetched Wi-Fi packets are then transmitted, via a chip-to-chip interconnect link 330 (e.g., PCIe, CCIX, or CXL link, etc.,), to a second DMA engine 348 in the second baseband processor 340. The Wi-Fi packets received at the second DMA engine 348 are stored into a local memory 347 (e.g., a DDR memory) of the second baseband processor 340 using DMA by a second DMA controller (e.g., a DDR controller) 346. This step of ingress flow for Wi-Fi traffic is shown as the dashed line 333.

It shall be noted that the first DMA engine 318, the second DMA engine 348, and the chip-to-chip interconnect link 330 are homogeneous. In other words, the first DMA engine 318, the second DMA engine 348, and the chip-to-chip interconnect link 330 may need to be associated with the same type of communication protocol or topology. For example, the first DMA engine 318, the second DMA engine 348, and the chip-to-chip interconnect link 330 may be a first PCIe DMA engine, a second PCIe DMA engine, and a PCIe link respectively. Or alternatively, the first DMA engine 318, the second DMA engine 348, and the chip-to-chip interconnect link 330 may be a first CCIX DMA engine, a second CCIX DMA engine, and a CCIX link respectively. Or alternatively, the first DMA engine 318, the second DMA engine 348, and the chip-to-chip interconnect link 330 may be a first CXL DMA engine, a second CXL DMA engine, and a CXL link respectively.

Afterwards, Wi-Fi packets stored into the local memory 347 may be fetched using DMA by a second DMA controller (e.g., a DDR controller) 346 for processing in a Wi-Fi processing block 345 in the second baseband processor 340. This step of ingress flow for Wi-Fi traffic is shown as the dashed line 334. The Wi-Fi processing block 345 may comprise one or more cores (and allocated caches) specified for Wi-Fi signal processing.

Figure 3B:
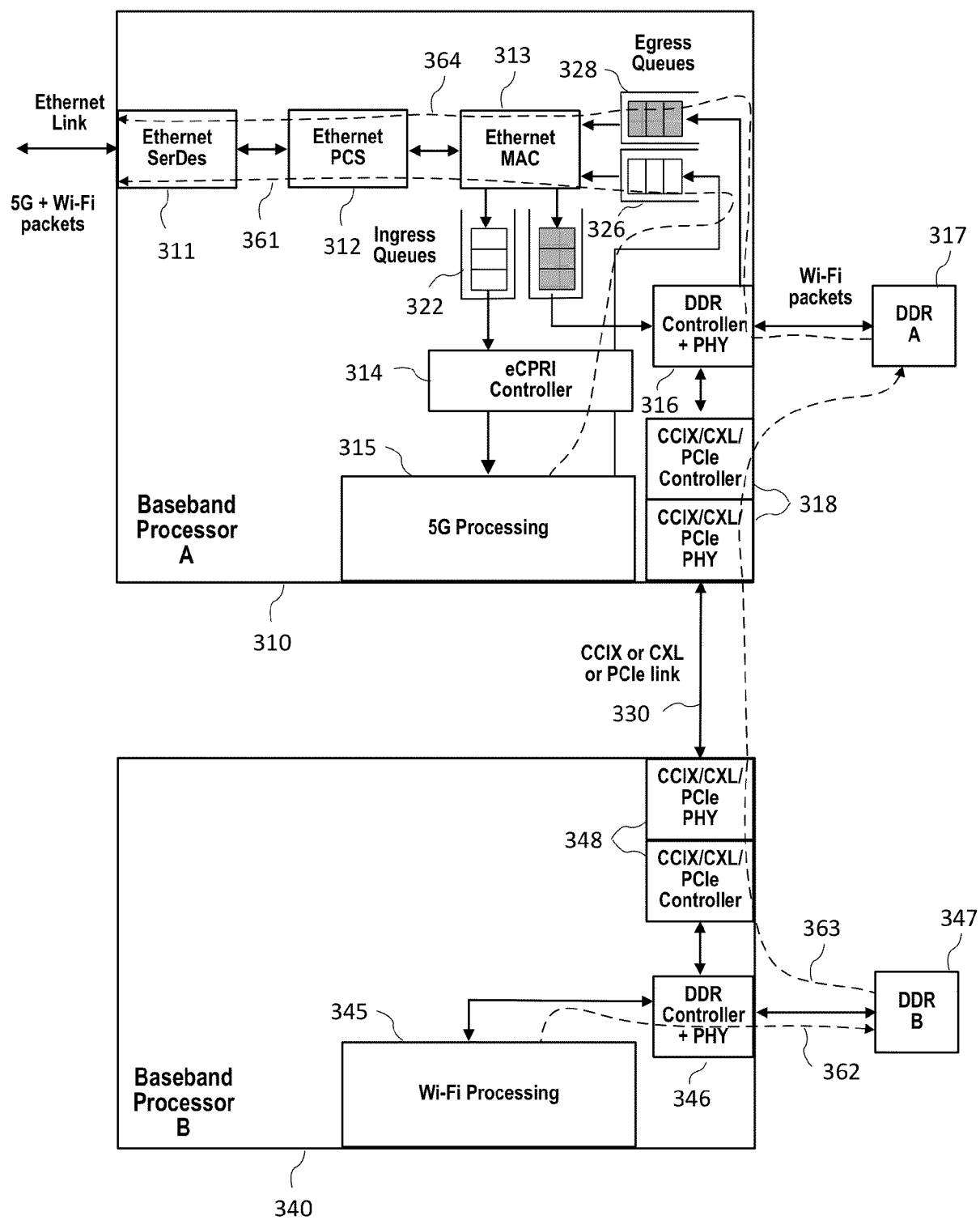
FIG. 3B graphically depicts egress data flows for Ethernet link sharing between 5G Fronthaul and Wi-Fi deployments, according to embodiments of the present disclosure.

FIG. 3B graphically depicts egress data flows for Ethernet link sharing between 5G Fronthaul and Wi-Fi deployments, according to embodiments of the present disclosure. For 5G traffic, the egress 5G packets processed by the 5G processing block 315 are sent, via the eCPRI Controller 314, to an egress MAC queue 326 dedicated for 5G, and fetched by MAC block 313 in the first baseband processor 310. The MAC block sends egress 5G packets, along with egress Wi-Fi packets, to the Ethernet PCS layer 312 for physical layer information addition. Egress packets with physical layer information addition are then transmitted, via the SerDes 311, from the first baseband processor 310. The egress flow for 5G traffic is shown as the dashed line 361.

In one or more embodiments, egress data flow for Wi-Fi traffic may take multiple steps. Wi-Fi packets generated by the Wi-Fi processing block 345 are stored into the local memory 347 of the second baseband processor 340 using DMA by the second DMA controller 346. This step of egress flow for Wi-Fi traffic is shown as the dashed line 362.

Afterwards, the second DMA engine 348 fetches Wi-Fi packets from the local memory 347. The fetched Wi-Fi packets are then transmitted, via the chip-to-chip interconnect link 330, to the first DMA engine 318 in the first baseband processor 310. The Wi-Fi packets received at the first DMA engine 318 are stored into the local memory 317 of the first baseband processor 310 using DMA by the first DMA controller 316. This step of egress flow for Wi-Fi traffic is shown as the dashed line 363.

Subsequently, the Wi-Fi packets stored in the local memory 317 are fetched, by the first DMA controller 316, into an egress queue 326 dedicated for Wi-Fi egress data, and then retrieved by the MAC block 313 in the first baseband processor 310. The MAC block sends egress Wi-Fi packets, along with egress 5G packets, to the Ethernet PCS layer 312 for physical layer information addition. Egress packets with physical layer information addition are then transmitted, via the SerDes 311, from the first baseband processor 310. The egress flow for Wi-Fi traffic is shown as the dashed line 364.

In one or more embodiments, for ingress flow and egress flow, the sizing of the ingress or egress queue (for 5G or Wi-Fi), and the performance/ latency/ throughput for each RAT is controllable via dedicated hardware, or a combination of hardware and software entities. Furthermore, the relative throughputs of 5G and Wi-Fi traffic may also be adjusted to allow multiple different deployment scenarios.

Figure 4:
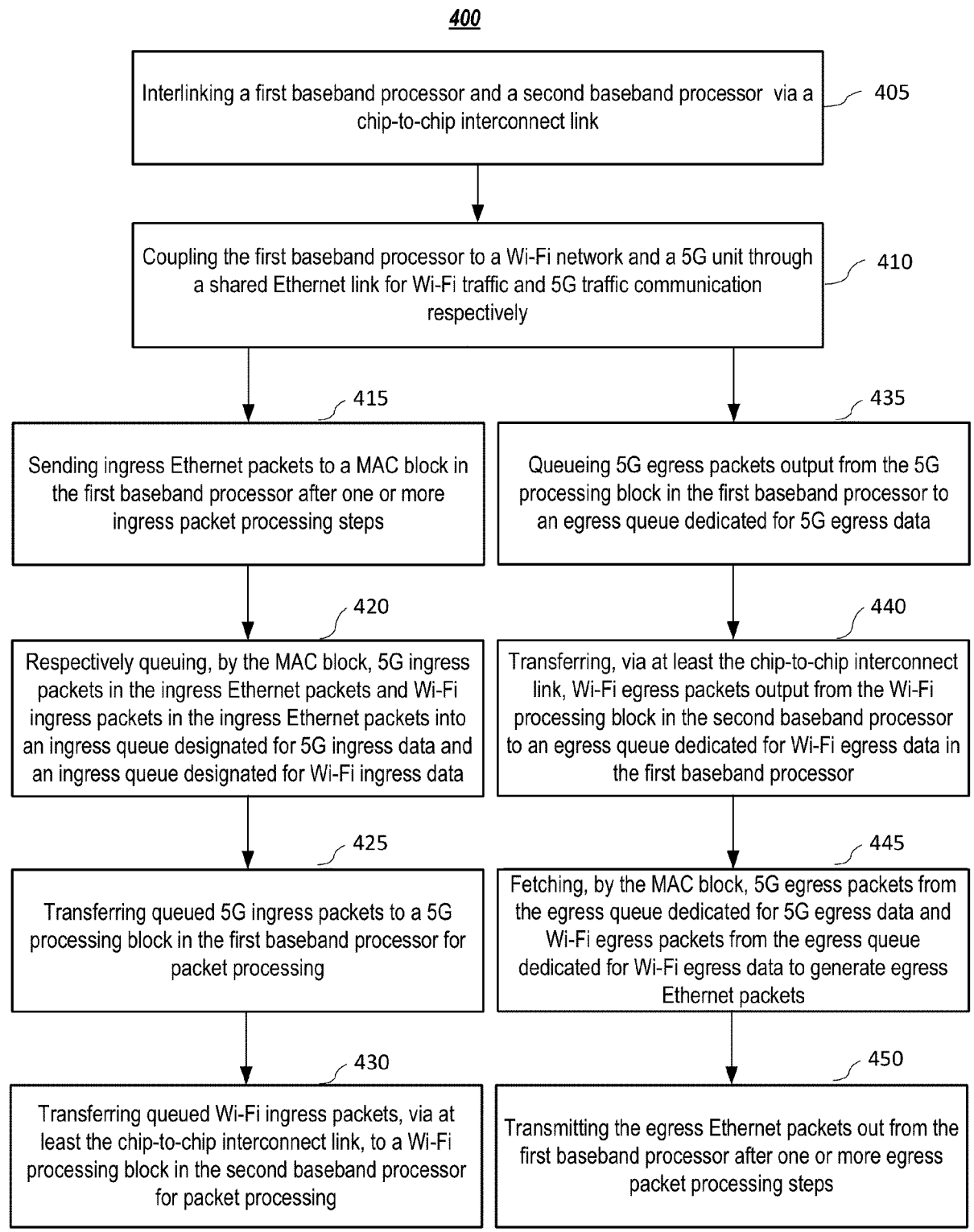
FIG. 4 depicts a process for Ethernet link sharing between 5G Fronthaul and Wi-Fi deployments, according to embodiments of the present disclosure.

FIG. 4 depicts a process for Ethernet link sharing between 5G Fronthaul and Wi-Fi deployments, according to embodiments of the present disclosure. In step 405, a first baseband processor and a second baseband processor are interlinked via a chip-to-chip interconnect link. The chip-to-chip interconnect link may be a CCIX link, a CXL, a PCIe link, or a link using Interlaken interconnect protocol, etc. In step 410, the first baseband processor couples to a Wi-Fi network and a 5G unit through a shared Ethernet link for Wi-Fi traffic (e.g., Wi-Fi Backhaul traffic) and 5G traffic (e.g., 5G Fronthaul traffic) communication respectively. The shared Ethernet link comprises an Ethernet switch, an Ethernet connector, and an Ethernet PHY.

In step 415, ingress Ethernet packets to the first baseband processor are sent to a MAC block in the first baseband processor after one or more ingress packet processing steps, which may comprise data conversion between serial and parallel interfaces performed by a SerDes, physical layer information stripping performed by an Ethernet PCS, etc. In step 420, the MAC block in the first baseband processor receptively queues 5G ingress packets in the ingress Ethernet packets and Wi-Fi ingress packets in the ingress Ethernet packets into an ingress queue designated for 5G ingress data and an ingress queue designated for Wi-Fi ingress data. In step 425, queued 5G ingress packets are transferred to a 5G processing block in the first baseband processor for packet processing. In step 430, queued Wi-Fi ingress packets are transferred, via at least the chip-to-chip interconnect link, to a Wi-Fi processing block in the second baseband processor for packet processing. Further details for ingress data processing may be referred to FIG. 3A and corresponding description.

In step 435, 5G egress packets output from the 5G processing block in the first baseband processor are queued to an egress MAC queue dedicated for 5G egress data. In step 440, Wi-Fi egress packets output from Wi-Fi processing block in the second baseband processor are transferred, via at least the chip-to-chip interconnect link, to an egress MAC queue dedicated for Wi-Fi egress data in the first baseband processor. In step 445, the MAC block in the first baseband processor fetches 5G egress packets from the egress MAC queue dedicated for 5G egress data and Wi-Fi egress packets from the egress MAC queue dedicated for Wi-Fi egress data to generate egress Ethernet packets. In step 450, the egress Ethernet packets are transmitted out from the first baseband processor after one or more egress packet processing steps, which may comprise physical layer information addition performed by an Ethernet PCS, data conversion between serial and parallel interfaces performed by a SerDes, etc. Further details for egress data processing may be referred to FIG. 3B and corresponding description.

Although steps 415-430 for ingress data processing and steps 435-450 may be performed in parallel as shown in FIG. 4, one skilled in the art may understand that those steps may also be performed in different variations, e.g., partially in parallel, alternatively, etc. Such variations shall still be within the scope of the present patent disclosure.

Figure 5:
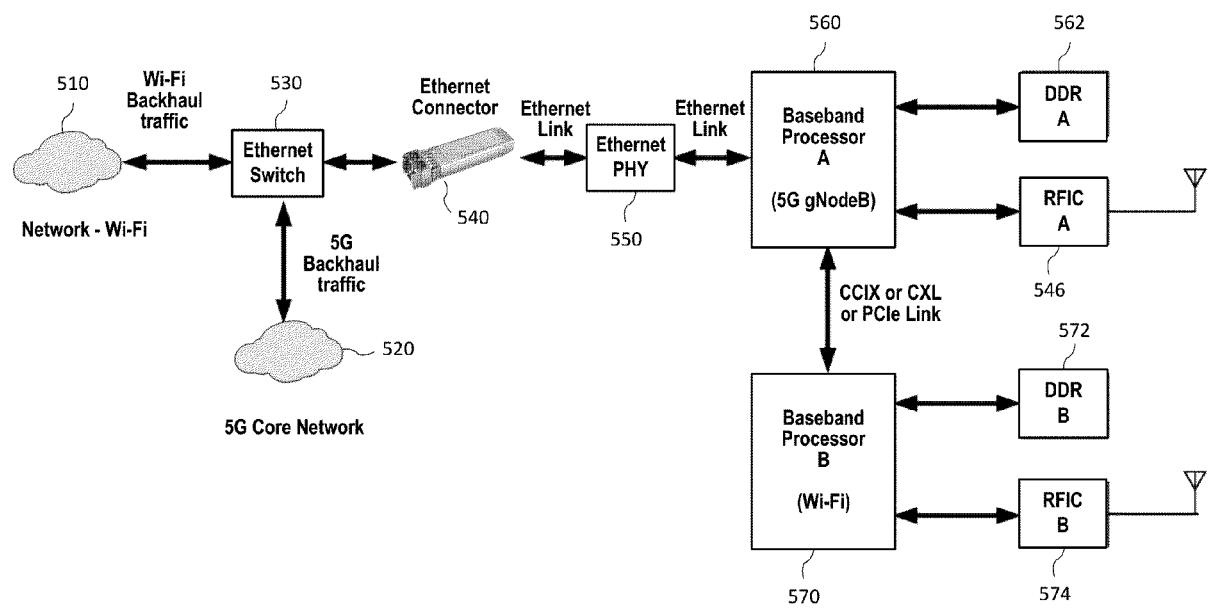
FIG. 5 graphically depicts Ethernet link sharing between 5G gNodeB and Wi-Fi deployments, according to embodiments of the present disclosure.

C. Embodiments of Ethernet Link Sharing Between 5G gNodeB and Wi-Fi Deployments 5G gNodeB (or gNB) is the radio base station in 5G NR networks. Described in this section are embodiments of Ethernet link sharing between 5G gNodeB and Wi-Fi deployments, which is a related deployment scenario with respect to the embodiment of Ethernet link sharing between 5G Fronthaul and Wi-Fi deployments. As shown in FIG. 5, two baseband processors, one 560 dedicated for 5G processing (e.g., 5G gNodeB) and one 570 dedicated for Wi-Fi respectively, are used for Ethernet link sharing between 5G gNodeB and Wi-Fi deployments. The first baseband processor 560 and the second baseband processor 570 are interlinked by a chip-to-chip interconnect link, e.g., a CCIX link, a CXL, a PCIe link, or a link using Interlaken interconnect protocol, etc.

The first baseband processor 560 couples to a Wi-Fi network 510 and a 5G core network 520 through a shared Ethernet link, which comprises an Ethernet switch 530, an Ethernet connector 540, and an Ethernet PHY 550. The Ethernet switch 530 communicates to the Wi-Fi network 510 and the 5G core network 520 for Wi-Fi Backhaul traffic and 5G Backhaul traffic communication respectively.

The first baseband processor 560 couples to a first local memory 562 for data read/write operation and a first RFIC 564 for signal communication wirelessly. Similarly, the second baseband processor 570 couples to a second local memory 572 for data read/write operation and a second RFIC 574 for signal communication wirelessly.

The ingress and egress data flows for Ethernet link sharing between 5G gNodeB and Wi-Fi are similar to those for Ethernet link sharing between described in FIG. 3A and FIG. 3B respectively, with the exception that the eCPRI Controller is not employed for the scenario of Ethernet link sharing between 5G gNodeB and Wi-Fi. Instead, ingress 5G packets are queued in an ingress queue dedicated for 5G data, and then flow directly to a 5G Processing Block. In the egress path, egress 5G packets from the 5G Processing Block are transmitted directly to an egress queue dedicated for 5G data, without going through the eCPRI Controller. Accordingly, one or more steps described in FIG. 4 may also be applicable for Ethernet link sharing between 5G gNodeB and Wi-Fi deployments.

D. Embodiments of Ethernet Link Sharing Between Two Wi-Fi Deployments

Figure 6:
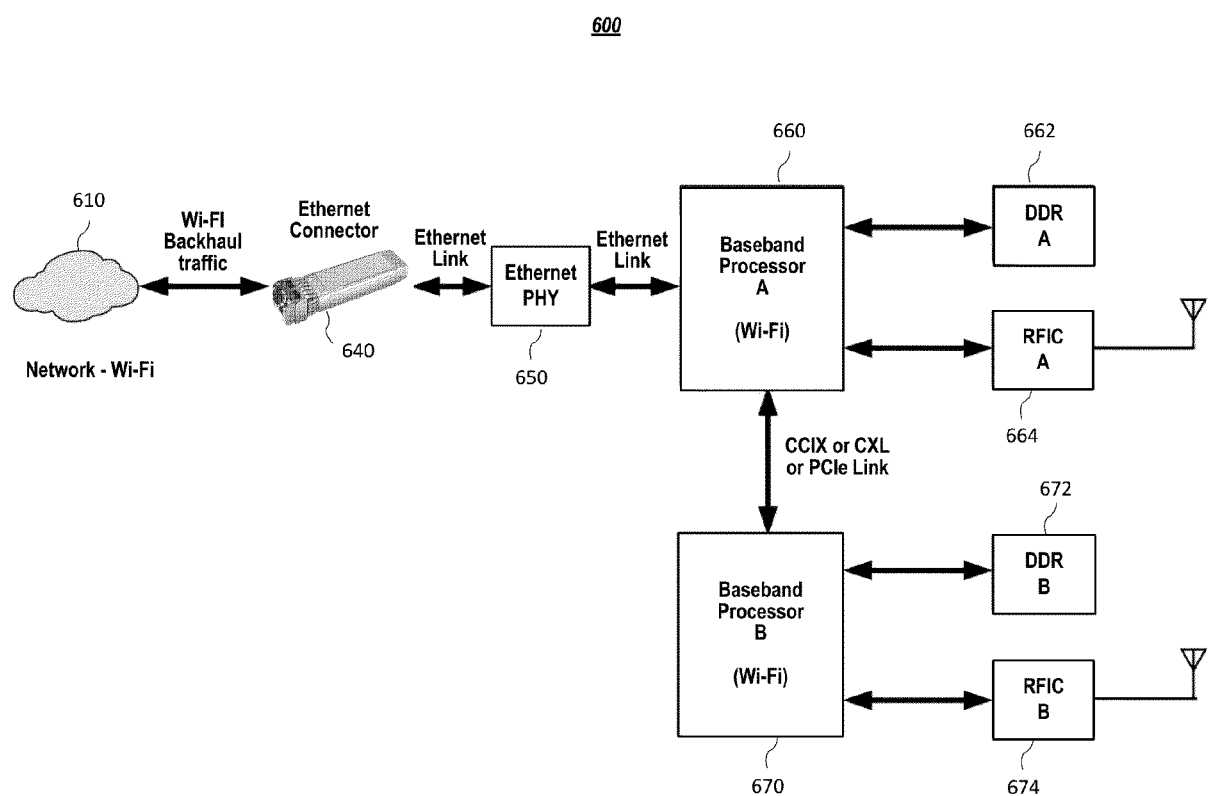
FIG. 6 graphically depicts Ethernet link sharing between two Wi-Fi deployments, according to embodiments of the present disclosure.

Besides Ethernet link sharing between 5G and Wi-Fi deployments, embodiments of Ethernet link sharing between two different Wi-Fi deployments are also disclosed in FIG. 6. The two different Wi-Fi deployments may be associated with two different Wi-Fi bands (e.g., 900 MHz and 2.4 GHz), Wi-Fi types (e.g., Wi-Fi 5 and Wi-Fi 6), etc. As shown in FIG. 6, two baseband processors, one 660 dedicated for a first Wi-Fi deployment and one 670 dedicated for a second Wi-Fi deployment respectively, are used for Ethernet link sharing between two Wi-Fi deployments. The first baseband processor 660 and the second baseband processor 670 are interlinked by a chip-to-chip interconnect link, e.g., a CCIX link, a CXL, a PCIe link, or a link using Interlaken interconnect protocol, etc.

The first baseband processor 660 couples to a Wi-Fi network 510 via a shared Ethernet link, which comprises an Ethernet connector 640, and an Ethernet PHY 650. The first baseband processor 660 couples to a first local memory 662 for data read/write operation and a first RFIC 564 for signal communication wirelessly. Similarly, the second baseband processor 670 couples to a second local memory 672 for data read/write operation and a second RFIC 674 for signal communication wirelessly.

Figure 7A:
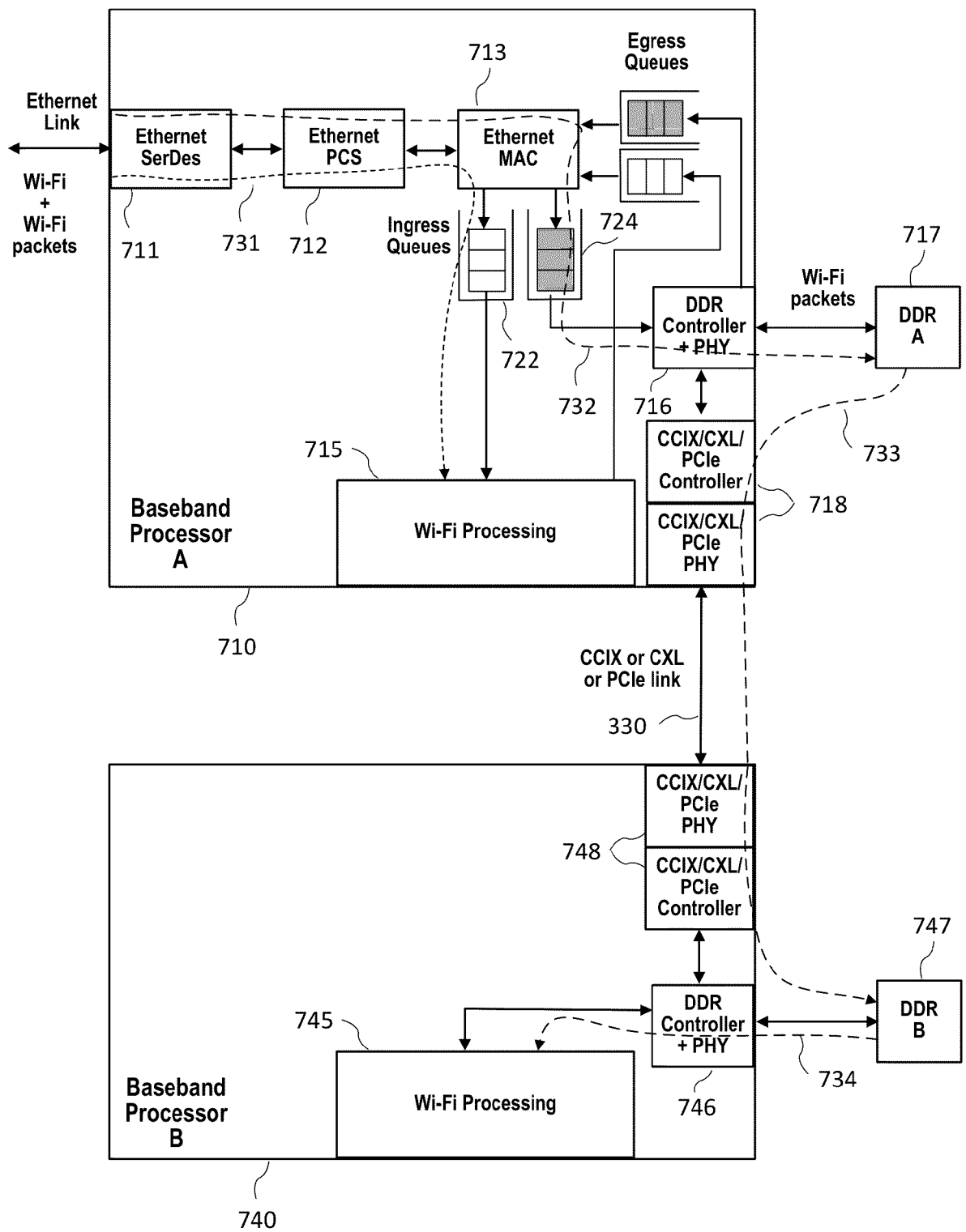
FIG. 7A graphically depicts ingress data flows for Ethernet link sharing between two Wi-Fi deployments, according to embodiments of the present disclosure.

FIG. 7A graphically depicts ingress data flows for Ethernet link sharing between two Wi-Fi deployments, according to embodiments of the present disclosure. Ingress Ethernet packets, comprising Wi-Fi packets for different deployments, enter the first baseband processor 710 via a high speed SerDes 711, which may operate at 10 Gbps, 25 Gbps, or 50 Gbps, etc. These Ingress Ethernet packets are stripped of physical layer information at an Ethernet Physical Coding Sublayer (PCS) 712, and then enter a medium access control (MAC) block 713.

The MAC block 713 queues Wi-Fi packets for the first Wi-Fi deployment in the Ingress Ethernet packets into an ingress queue 722 designated for the first Wi-Fi deployment. The queued Wi-Fi packets in the ingress queue 722 are transmitted to a first Wi-Fi processing block 715 in the first baseband processor 710. The ingress flow for Wi-Fi packets for the first Wi-Fi deployment is shown as the dashed line 731.

In one or more embodiments, the ingress flow for Wi-Fi traffic for the second Wi-Fi deployment may take multiple steps. The MAC block 713 queues Wi-Fi packets for the second Wi-Fi deployment in the Ingress Ethernet packets into an ingress queue 724 designated for the second Wi-Fi deployment. The ingress queue 724 may be independent from the ingress queue 722. The queued Wi-Fi packets for the second Wi-Fi deployment are stored into a local memory (e.g., a DDR memory) 717 of the first baseband processor 710 using DMA by a first DMA controller (e.g., a DDR controller) 716. This step of ingress flow for Wi-Fi traffic for the first Wi-Fi deployment is shown as the dashed line 732.

Subsequently, a first DMA engine 718 fetches stored Wi-Fi packets from the local memory 717. The first DMA engine 718 may a PCIe (or CCIX, or CXL) DMA engine comprising a PCIe controller (or a CCIX controller, or CXL controller) and a PCIe PHY (or CCIX PHY, or CXL PHY). The fetched Wi-Fi packets are then transmitted, via a chip-to-chip interconnect link 730 (e.g., PCIe, CCIX, or CXL link, etc.,), to a second DMA engine 748 in the second baseband processor 740. The Wi-Fi packets received at the second DMA engine 748 are stored into a local memory 747 (e.g., a DDR memory) of the second baseband processor 740 using DMA by a second DMA controller (e.g., a DDR controller) 746. This step of ingress flow for Wi-Fi traffic for the second Wi-Fi deployment is shown as the dashed line 733.

Afterwards, Wi-Fi packets stored into the local memory 747 may be fetched using DMA by a second DMA controller (e.g., a DDR controller) 746 for processing in a Wi-Fi processing block 746 in the second baseband processor 740. This step of ingress flow for Wi-Fi traffic for the second Wi-Fi deployment is shown as the dashed line 734.

Figure 7B:
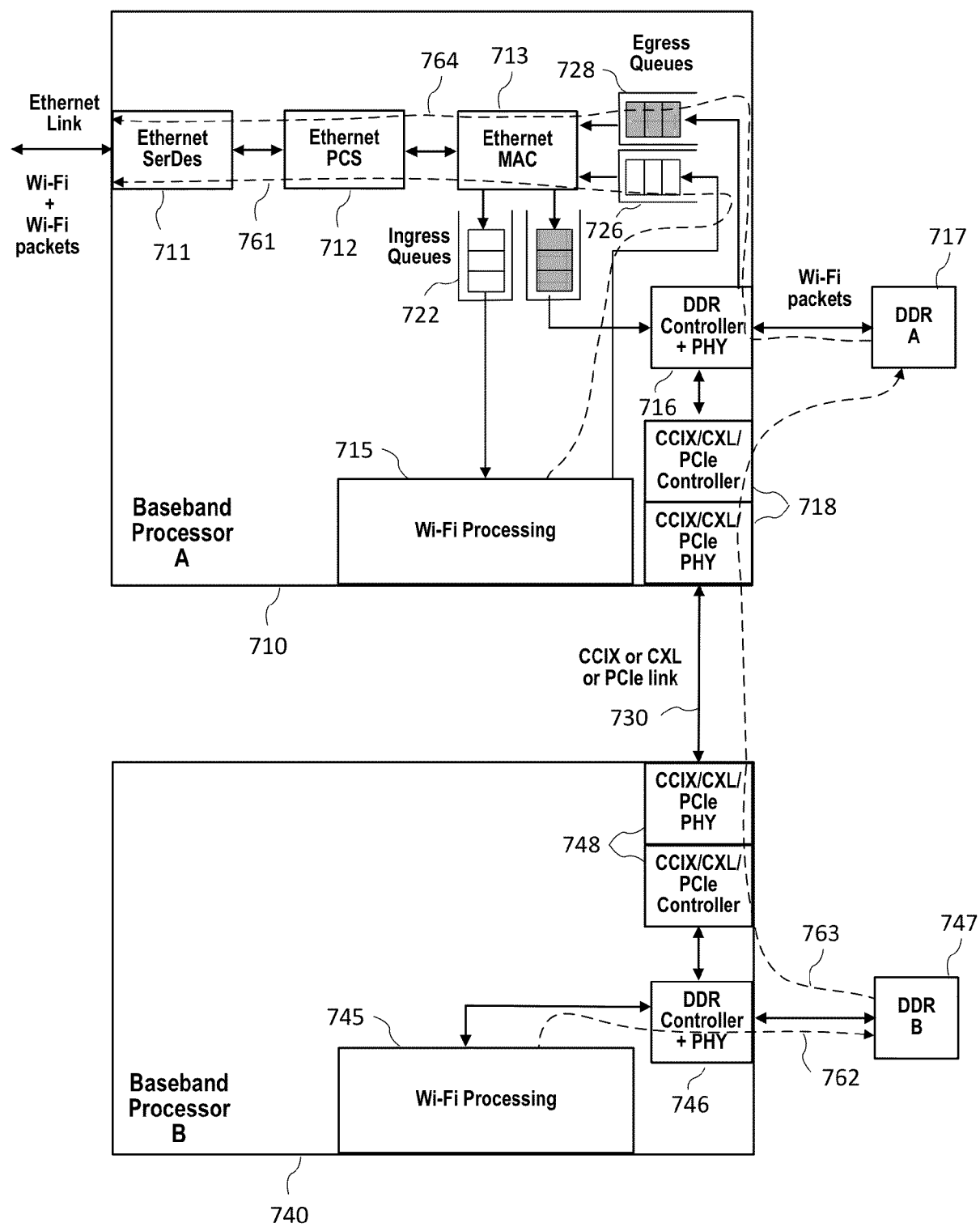
FIG. 7B graphically depicts egress data flows for Ethernet link sharing between two Wi-Fi deployments, according to embodiments of the present disclosure.

FIG. 7B graphically depicts egress data flows for Ethernet link sharing between two Wi-Fi deployments, according to embodiments of the present disclosure. For Wi-Fi traffic corresponding to the first Wi-Fi deployment, egress Wi-Fi packets processed by the first processing block 715 are transmitted to an egress MAC queue 726 dedicated for the first Wi-Fi deployment, and fetched by MAC block 713 in the first baseband processor 710. The MAC block sends egress Wi-Fi packets corresponding to the first Wi-Fi deployment, along with egress Wi-Fi packets corresponding to the second Wi-Fi deployment, to the Ethernet PCS layer 712 for physical layer information addition. Egress packets with physical layer information addition are then transmitted, via the SerDes 711, out of the first baseband processor 710. The egress flow for Wi-Fi packets corresponding to the first Wi-Fi deployment is shown as the dashed line 761.

In one or more embodiments, egress data flow for Wi-Fi traffic corresponding to the second Wi-Fi deployment may take multiple steps. Wi-Fi packets generated by the Wi-Fi processing block 745 are stored into the local memory 747 of the second baseband processor 740 using DMA by the second DMA controller 746. This step of egress flow for Wi-Fi traffic corresponding to the second Wi-Fi deployment is shown as the dashed line 762.

Afterwards, the second DMA engine 748 fetches Wi-Fi packets from the local memory 747. The fetched Wi-Fi packets are then transmitted, via the chip-to-chip interconnect link 730, to the first DMA engine 718 in the first baseband processor 710. The Wi-Fi packets received at the first DMA engine 718 are stored into the local memory 717 of the first baseband processor 710 using DMA by the first DMA controller 716. This step of egress flow for Wi-Fi traffic corresponding to the second Wi-Fi deployment is shown as the dashed line 763.

Subsequently, the Wi-Fi packets stored in the local memory 717 are fetched, by the first DMA controller 716, into an egress queue 726 dedicated for the second Wi-Fi deployment, and then retrieved by the MAC block 713 in the first baseband processor 710. The MAC block sends egress Wi-Fi packets corresponding to the second Wi-Fi deployment, along with egress 5G packets corresponding to the first Wi-Fi deployment, to the Ethernet PCS layer 712 for physical layer information addition. Egress packets with physical layer information addition are then transmitted, via the SerDes 711, from the first baseband processor 710. The egress flow for Wi-Fi traffic is shown as the dashed line 764.

In one or more embodiments, for ingress flow and egress flow, the sizing of the ingress or egress queue (corresponding to the first or the second Wi-Fi deployment), and the performance/ latency/ throughput for each RAT is controllable via dedicated hardware, or a combination of hardware and software entities. Furthermore, the relative throughputs of Wi-Fi traffic corresponding to the first or the second Wi-Fi deployment may also be adjusted to allow multiple different deployment scenarios.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for Ethernet link sharing comprising:
   interlinking a first baseband processor and a second baseband processor via a chip-to-chip interconnect link;
   coupling the first baseband processor to a Wi-Fi network and a 5G network through a shared Ethernet link for Wi-Fi traffic and 5G traffic communication respectively;
   implementing data flows for ingress Ethernet packets to the first baseband processor using steps comprising:
      sending ingress Ethernet packets to a media access control (MAC) block in the first baseband processor after one or more ingress packet processing steps;
      respectively queuing, by the MAC block, 5G ingress packets in the ingress Ethernet packets and Wi-Fi ingress packets in the ingress Ethernet packets into an ingress queue designated for 5G ingress data and an ingress queue designated for Wi-Fi ingress data;
      transferring queued 5G ingress packets to a 5G processing block in the first baseband processor for packet processing; and
      transferring queued Wi-Fi ingress packets, via at least the chip-to-chip interconnect link, to a Wi-Fi processing block in the second baseband processor for packet processing; and
   implementing data flows for egress Ethernet packets out of the first baseband processor using steps comprising:
      queueing 5G egress packets output from the 5G processing block in the first baseband processor to an egress queue dedicated for 5G egress data;
      transferring, via at least the chip-to-chip interconnect link, Wi-Fi egress packets output from the Wi-Fi processing block in the second baseband processor to an egress queue dedicated for Wi-Fi egress data in the first baseband processor;
      fetching, by the MAC block, 5G egress packets from the egress queue dedicated for 5G egress data and Wi-Fi egress packets from the egress queue dedicated for Wi-Fi egress data to generate egress Ethernet packets; and
      transmitting the egress Ethernet packets out from the first baseband processor after one or more egress packet processing steps.

2. The method of claim 1 wherein the chip-to-chip interconnect link is a cache coherent interconnect for accelerators (CCIX) link, a compute express link (CXL), or a peripheral component interconnect express (PCIe) link.

3. The method of claim 1 wherein the one or more ingress packet processing steps comprise:
   data conversion between serial and parallel interfaces performed by a SerDes in the first baseband processor; and
   physical layer information stripping performed by an Ethernet Physical Coding Sublayer (PCS) in the first baseband processor.

4. The method of claim 3 wherein the one or more egress packet processing steps comprise:
   physical layer information addition performed by the Ethernet PCS; and
   data conversion between serial and parallel interfaces performed by the SerDes.

5. The method of claim 1 wherein the ingress queue designated for 5G ingress data is independent from the ingress queue designated for Wi-Fi ingress data, the egress queue designated for 5G egress data is independent from the egress queue designated for Wi-Fi egress data.

6. The method of claim 1 wherein the queued 5G ingress packets are transferred to the 5G processing block via an enhanced Common Packet Radio Interface (eCPRI) controller in the first baseband processor, the 5G egress packets output from the 5G processing block are queued to the egress queue dedicated for 5G egress data via the enhanced eCPRI controller.

7. The method of claim 1 wherein transferring queued Wi-Fi ingress packets, via at least the chip-to-chip interconnect link, to a Wi-Fi processing block in the second baseband processor for packet processing comprising:
   storing, using direct memory access (DMA) by a first DMA controller in the first baseband processor, the queued Wi-Fi ingress packets into a local memory of the first baseband processor;
   fetching, by a first DMA engine in the first baseband processor, stored Wi-Fi ingress packets from the local memory of the first baseband processor, the fetched Wi-Fi ingress packets are transmitted, via the chip-to-chip interconnect link to a second DMA engine in the second baseband processor;
   storing, using DMA by a second DMA controller in the second baseband processor, Wi-Fi ingress packets received at the second DMA engine into a local memory of the second baseband processor; and
   fetching, by a second DMA controller in the second baseband processor, Wi-Fi packets stored in the local memory of the second baseband processor, to the Wi-Fi processing block in the second baseband processor.

8. The method of claim 7 wherein transferring, via at least the chip-to-chip interconnect link, Wi-Fi egress packets output from the Wi-Fi processing block in the second baseband processor to an egress queue dedicated for Wi-Fi egress data in the first baseband processor comprising:
   storing, using DMA by the second DMA controller, the Wi-Fi egress packets output from the Wi-Fi processing block, to the local memory of the second baseband processor;

fetching, by the second DMA engine in the second baseband processor, stored Wi-Fi egress packets from the local memory of the second baseband processor, the fetched Wi-Fi egress packets are transmitted, via the chip-to-chip interconnect link to the first DMA engine in the first baseband processor;

storing, using DMA by the first DMA engine in the first baseband processor, Wi-Fi egress packets received at the first DMA engine into the local memory of the first baseband processor; and fetching, by the first DMA controller in the first baseband processor, Wi-Fi egress packets stored in the local memory of the first baseband processor into the egress queue dedicated for Wi-Fi egress data.

9. A system for implementing Ethernet link sharing comprising:

a first baseband processor coupled to a Wi-Fi network and a 5G network through a shared Ethernet link for ingress Ethernet packets receiving and egress Ethernet packets transmitting, the ingress Ethernet packets comprises 5G ingress packets from the 5G network and Wi-Fi ingress packets from the Wi-Fi network, the egress Ethernet packets comprises 5G egress packets to the 5G network and Wi-Fi egress packets to the Wi-Fi network, the first baseband processor comprising:

a 5G processing block designated for 5G data processing;

an Ethernet media access control (MAC) block, the Ethernet MAC block respectively queues 5G ingress packets into an ingress queue designated for 5G ingress data and Wi-Fi ingress packets into an ingress queue designated for Wi-Fi ingress data, the Ethernet MAC block respectively queues 5G egress packets into an egress queue designated for 5G egress data and Wi-Fi ingress packets into an ingress queue designated for Wi-Fi egress data; and a second baseband processor coupled to the first baseband processor via an via a chip-to-chip interconnect link, the second baseband processor comprises a Wi-Fi processing block designated for Wi-Fi data processing, the Wi-Fi processing block processes Wi-Fi ingress packets transferred from the ingress queue designated for Wi-Fi ingress data, via at least the chip-to-chip interconnect link, the Wi-Fi processing block outputs Wi-Fi egress packets transferred to the egress queue designated for Wi-Fi egress data, via at least the chip-to-chip interconnect link.

10. The system of claim 9 wherein the chip-to-chip interconnect link is a cache coherent interconnect for accelerators (CCIX) link, a compute express link (CXL), or a peripheral component interconnect express (PCIe) link.

11. The system of claim 10 wherein the ingress queue designated for 5G ingress data is independent from the ingress queue designated for Wi-Fi ingress data, the egress queue designated for 5G egress data is independent from the egress queue designated for Wi-Fi egress data.

12. The system of claim 10 wherein the first baseband processor further comprising an enhanced Common Packet Radio Interface (eCPRI) controller, the queued 5G ingress packets are transferred to the 5G processing block via the eCPRI controller, the 5G egress packets output from the 5G processing block are queued to the egress queue dedicated for 5G egress data via the enhanced eCPRI controller.

13. The system of claim 10 wherein the first baseband processor further comprising:

a first direct memory access (DMA) controller that stores, using DMA, the queued Wi-Fi ingress packets into a local memory of the first baseband processor; and a first DMA engine that fetches stored Wi-Fi ingress packets from the local memory of the first baseband processor, the fetched Wi-Fi ingress packets are transmitted, via the chip-to-chip interconnect link to the second baseband processor.

14. The system of claim 13 wherein the second baseband processor further comprising:

a second DMA controller that stores, using DMA, Wi-Fi ingress packets transmitted from the first baseband processor into a local memory of the second baseband processor; and a second DMA controller that fetches Wi-Fi packets stored in the local memory of the second baseband processor to the Wi-Fi processing block in the second baseband processor.

15. The system of claim 14 wherein the first DMA engine and the second DMA engine are cache coherent interconnect for accelerators (CCIX) DMA engines, compute express link (CXL) DMA engines, or peripheral component interconnect express (PCIe) DMA engines.

16. A method for Ethernet link sharing comprising:

interlinking a first baseband processor and a second baseband processor via a chip-to-chip interconnect link;

coupling the first baseband processor to a first network and a second network through a shared Ethernet link for ingress Ethernet packets receiving and egress Ethernet packets transmitting, the ingress Ethernet packets comprises ingress packets from the first network and ingress packets from the second network, the egress Ethernet packets comprises egress packets to the first network and egress packets to the second network;

processing the ingress Ethernet packets using steps comprising:

respectively queuing, by a media access control (MAC) block in the first baseband processor, ingress packets from the first network and ingress packets from the first network into an ingress queue designated for the first network and an ingress queue designated for the second network;

transferring queued ingress packets from the first network to a first processing block in the first baseband processor for packet processing;

storing, using direct memory access (DMA) by a first DMA controller in the first baseband processor, the queued ingress packets from the second network into a local memory of the first baseband processor;

fetching, by a first DMA engine in the first baseband processor, stored ingress packets from the second network in the local memory of the first baseband processor, the fetched Wi-Fi ingress packets are transmitted, via at least the chip-to-chip interconnect link, to a second processing block in the second baseband processor for packet processing; and transmitting the egress Ethernet packets using steps comprising:

queueing egress packets output from the first processing block to an egress queue dedicated for the first network;

transferring, via at least the chip-to-chip interconnect link, egress packets output from the second processing block in the second baseband processor to the first baseband processor;

storing, using DMA by the first DMA engine in the first baseband processor, the egress packets output from the second processing block into the local memory of the first baseband processor;

fetching, by the first DMA controller in the first baseband processor, egress packets stored in the local memory of the first baseband processor into an egress queue dedicated for the second network;

fetching, by the MAC block, egress packets from the egress queue dedicated for the first network and egress packets from the egress queue dedicated for the second network to generate the egress Ethernet packets.

17. The method of claim 16 wherein the first network is a 5G network, the second network is a Wi-Fi network.

18. The method of claim 16 wherein the first network is a first Wi-Fi deployment, the second network is a second Wi-Fi deployment.

19. The method of claim 16 wherein the chip-to-chip interconnect link is a cache coherent interconnect for accelerators (CCIX) link, a compute express link (CXL), or a peripheral component interconnect express (PCIe) link.

20. The method of claim 19 wherein the ingress queue designated for the first network is independent from the ingress queue designated for second network, the egress queue designated for the first network is independent from the egress queue designated for the second network.

* * * * *